US007017152B2

(12) United States Patent
Bystedt et al.

(10) Patent No.: US 7,017,152 B2
(45) Date of Patent: Mar. 21, 2006

(54) METHOD OF DETECTING LOST OBJECTS IN A SOFTWARE SYSTEM

(75) Inventors: Ingemar Bystedt, Bromma (SE); Niklas Wretman, Johanneshov (SE); Bo Dunell, Huddinge (SE)

(73) Assignee: Appmind Software AB, Stockholm (SE)

( * ) Notice: Subject to any disclaimer, the term of this patent is extended or adjusted under 35 U.S.C. 154(b) by 559 days.

(21) Appl. No.: 09/827,810

(22) Filed: Apr. 6, 2001

(65) Prior Publication Data

US 2004/0015848 A1 Jan. 22, 2004

(51) Int. Cl.
G06F 9/44 (2006.01)

(52) U.S. Cl. .................................................. 717/130

(58) Field of Classification Search ............ 707/103 R; 709/201–203, 248, 213; 711/202, 203, 207, 711/133–134, 141, 158; 717/127, 118, 140, 717/178, 131; 718/107, 104; 715/513, 740
See application file for complete search history.

(56) References Cited

U.S. PATENT DOCUMENTS

| 5,687,368 | A | * | 11/1997 | Nilsen ..................... 707/103 R |
| 6,182,083 | B1 | * | 1/2001 | Scheifler et al. ........ 707/103 R |
| 6,226,653 | B1 | * | 5/2001 | Alpern et al. .............. 707/206 |
| 6,425,057 | B1 | * | 7/2002 | Cherkasova et al. ........ 711/134 |
| 6,453,404 | B1 | * | 9/2002 | Bereznyi et al. ........... 711/171 |
| 6,480,862 | B1 | * | 11/2002 | Gall ............................... 707/3 |
| 6,658,653 | B1 | * | 12/2003 | Bates et al. ................. 717/131 |
| 6,772,199 | B1 | * | 8/2004 | Keller et al. ................ 709/213 |
| 6,801,223 | B1 | * | 10/2004 | Abbott et al. ............... 715/740 |

OTHER PUBLICATIONS

"AMT (Application Management Tool)," Internet, Jul. 20, 2001, http://www.twobyfour.com/products/amt/h2.htm.
"WAM (WEB Application Manger)," Internet, Jul. 20, 2001. http://www.twobyfour.com/products/wam/h2.htm.
"ACD (Alarm Collection Distributor)," Internet, Jul. 20, 2001, http://www.twobyfour.com/products/acd/h2.htm.
"RTR Probe (Reliable Transaction Router Probe)," Internet Jul. 20, 2001. http://www.twobyfour.com/products/rtr/h2.htm.
"Twobyfour VMS Surveillance Kit," Internet, Jul. 20, 2001. http://www.twobyfour.com/products/vms/h2.htm.

* cited by examiner

*Primary Examiner*—Kakali Chaki
*Assistant Examiner*—Tuan A. Wu
(74) *Attorney, Agent, or Firm*—Nixon & Vanderhye P.C.

(57) ABSTRACT

The execution of program sections written in an object-oriented programming language is supervised. A program section is started, and a supervision object is created as an instance of a class. In a memory, information is stored to identify the created object for a time period. The program section is terminated, and the information stored in the memory is removed when the created object is completed and/or inactive. The memory is then scanned to identify information that has been stored in the memory longer than the time period, and if so, an alarm signal is triggered.

29 Claims, 7 Drawing Sheets

METHOD OF DETECTING LOST OBJECTS IN A SOFTWARE SYSTEM

TECHNICAL FIELD

The present invention relates to a method of detecting lost objects in a software system and in particular to a method of providing surveillance capabilities for an object-oriented implementation of a distributed software system, e.g., a World Wide Web (WEB) application.

BACKGROUND AND SUMMARY

The amount of traffic on the web, i.e., in the Internet, is constantly increasing. Much of the traffic is produced by users who may not be familiar with the implementation of web software and its interfaces. Many software products have developed bad reputations for their cryptic error messages that are hard to understand and resolve. Consequently, web site user interfaces could better handle problem situations.

The surveillance of the computing environment of an Enterprise becomes the natural goal to many companies that rely on their computing environment to fulfil their business-critical mission, simply by the fact that if a user sees the error message, the web site or product has let the user down.

The surveillance of the computing environment is now-a-days called Enterprise Management. Enterprise Management could be divided into the following disciplines:

Network Management to provide surveillance of all network devices;

Systems Management to provide surveillance of all computers including the operating system;

Application Management to provide surveillance of all software applications; and Desktop Management to provide surveillance of all personal desktop computers and their users.

These disciplines sometimes overlap but the overall impression is that these four disciplines are generally applicable in the Enterprise Management area. A new discipline will be to provide surveillance of all mobile devices that are used in business-critical missions of a company.

In the future, many mobile devices act as a true part in a company's business critical applications since these devices will contain client software to be used as a part of an application. The software in the mobile devices will create errors and to be able to perform an action to correct the malfunction caused by the software error, even these devices must be managed.

The goal of Enterprise Management is to provide a focal point for surveillance of the computing environment in a company. An objective of an Enterprise Management Framework is to provide a solution automatically executed on all fatal events that has an impact on a company's IT based system. This scenario is far away for Enterprise Management but in the discipline of Network Management there are many solutions, some of which are patented and referred to in this application, since Network Management is a very mature discipline. Network Management is a very mature discipline.

Systems Management is beginning to mature, but still there are many proprietary solutions that provide a surveillance that is not integrated in the focal point of an Enterprise Management Framework. Application Management has just started to grow. There are a number of solutions to provide surveillance for the most wide-spread Applications such as Microsoft Exchange mail server, Oracle database, SAP R3 Enterprise Resource Planning System. But, most of the commercially available software applications lack management modules integrated in the Enterprise Management Frameworks, which makes them difficult to manage.

The requirements to manage an application consist of monitoring, logging and control. The monitoring lets the Management System explore the actions of an application and have predefined threshold rules to create an event when a rule is broken. The log messages in an application show how the actions proceed inside the application and when a message is created with a severity declaring that the application has detected a problem, this event is immediately forwarded to the Management System. On all critical events, either from monitoring or logging, the Management System may issue an action to solve the problem, an action that can be either automatic or manual. This control enables the Management system to modify the behavior of an application program or of the application as a whole. Many problems are small at the moment they occur, but if the application continues with this malfunction the severity of the problem can increase to the extent of a total outage of the business-critical application. An even worse scenario could be that a part of the service is no longer available but no one detects this except for some users that cannot perform their task.

There are two different methods in application management, intrusive and non-intrusive, also called white-box and black-box monitoring. Intrusive is when you modify the source code of the software application and non-intrusive is when you examine the application from the outside, i.e., track the "foot-prints" of the application. Non-intrusive could be to check if a process is running, to look for the text "error" in log-files or to check that a database is updated. Non-intrusive is vulnerable to changes in the source code of an application or in its run-time environment. When the non-intrusive method is used, developers not familiar with the application itself often write the management module. Because of lack of competent resources it is often too expensive to let the application developers implement the management module, since this is not developed with the same tools as the application itself.

The application programmers implement the intrusive method. To manage the application, the knowledge of the developer has only to be transferred into management information files used by the Management System, i.e., description of log messages and monitoring entities. The intrusive method is also less resource demanding since it reports its status when a malfunction occurs, which could be called auto-surveillance, the program provides its own management. This improves the reactivity of the Management System. The monitoring is of far better quality when it is based on the intrusive method, which also allows the Management System to be proactive, i.e., to avoid malfunctions which would inevitably have occurred without this type of surveillance. The intrusive method for surveillance is running on many Stock Exchanges throughout the world.

Management as a whole increases the "Quality of Service" (QoS), since the Management Systems decreases the outage time of a service. Use of the intrusive method increases the QoS, because a malfunction is detected earlier. Furthermore, it decreases the "Total Cost of Ownership" (TCO), since more information and more accurate knowledge about the application is stored outside in the management knowledge base, which makes the maintenance less expensive.

The Management Information Base (MIB), is the information carrier in a Simple Network Management Protocol (SNMP), which is the industry standard in Network Management. The goal was to define a MIB for SNMP to provide surveillance for a software application, i.e., Application Management. The use of SNMP is widespread in Enterprise Management, but it is not evident that SNMP is a suitable protocol in a complex software application because it is too "simple", even if it is an extremely well suited protocol to provide surveillance in Network Management.

A related product to this patent is the Application Manager Tool (AMT) to supervise process-based applications. AMT consists of a very small Application Programming Interface (API) and a Software Development Kit (SDK), to make application programs Management-ready. A Management-ready program provides surveillance of its operation immediately after it is installed and is ready to perform its function even before the application program has been started. The API is called AM API (Application Management Application Programming Interface). The naming of the API methods was designed to resemble the Application Response Measurement (ARM) API, a standard developed by the organization The Open Group. The "Quality of Service" consists of response measurement as well as monitoring, logging and control. A similar naming of the API methods facilitates for developers to apply these different aspects of "Quality of Service."

Another standard using the intrusive method for surveillance is called Application Instrumentation and Control (AIC). AIC is similar to Windows Management Interface (WMI), released by Microsoft. Both AIC and WMI interfaces consists of two parts, one for the application program and one for the console (client) part.

As the WEB evolution evolved there were disappointments at how immature the application development was, and still is. It is well known that most programming errors are only shown on the browser side, i.e., it is only the user that detects that the application has failed. When a WEB object unexpectedly disrupts execution due to a programming error often no one except the user in front of the browser notices this malfunction. Such a problem causes the browser to show an error message as "Server not responding". This is a fatal error and is shown only to the end user.

No event is sent to the Management System regarding this type of error. This means that the companies have to rely on reports from customers to become aware that their application has failed. The customer could easily choose another company to supply services if the customer loses confidence in the previous company that had a malfunctioning WEB application. It is known that for a company entering the WEB, a poorly functioning WEB site is very dangerous as the competitor is "only one click away." In this case, it could be better to shut down the WEB site and declare it to be in maintenance mode, to declare to customers that the company controls its business critical WEB applications.

Traditionally critical applications have been realized with real-time processes running on a back-end server. Today software is very often implemented in a distributed object oriented environment, comprising business objects running in one or several processes on one or several computers. The process to be described herein for management of WEB applications is very much focused to target monitoring of objects in that environment. The process supports surveillance on these objects and can report lost objects to a management system which makes it possible to provide surveillance on all different kinds of applications in an enterprise management framework, including WEB applications.

The present invention provides a method to automatically detect objects that unexpectedly disrupt execution in an object oriented software application. This intrusive method contains a registration of objects, i.e., class instances such as Java classes or C++ classes, in a persistent location so that the codes for the object may be classified. A monitor supervising the persistent location is able to detect expired objects, i.e., objects that have remained on the persistent location too long without having been properly removed therefrom, and report them as an alarm to the Enterprise Management Framework that there is an operational failure for the object that has not been deregistered. The registration is connected to a deregistration of the object when the object terminates. The deregistration removes the registered object from the persistent location. The registration will also handle objects that are active for a longer time period as the monitor is able to supervise the object for activity. To be able to track down a failure, methods for tracing object inheritance and context handling is provided by identifying the objects that have not been properly deregistered.

BRIEF DESCRIPTION OF THE DRAWINGS

The invention will now be described by way of a non-limiting embodiment with reference to the accompanying drawings, in which.

DETAILED DESCRIPTION

With reference to FIGS. 1–7, a network 1, such as the WEB or Internet, is illustrated (see FIG. 4) and it is connected to a plurality of servers 3 called WEB-servers in the Internet case. Personal computers, network terminals 5 called herein, may log into the network 1 and by sending an address into it to come in contact with a site or application run on the Internet. The sites or applications, also called services 7, are basically computer programs which are run on one or more of the servers 3. Generally, one or several services can run on one server and one service could run on one or several servers 3. When a network terminal 5 comes in contact with a service 7, the service transmits to the terminal a set of commands or instructions which are interpreted by a network browser program, not shown, in the network terminal. On the terminal, input to the service can be made such as by depressing keys of the keyboard of terminal and/or by pointing and clicking using a pointing means. The corresponding information is transmitted back to the service 7, which then executes program steps and sends a new set of commands to the network terminal 5.

Figure 5:
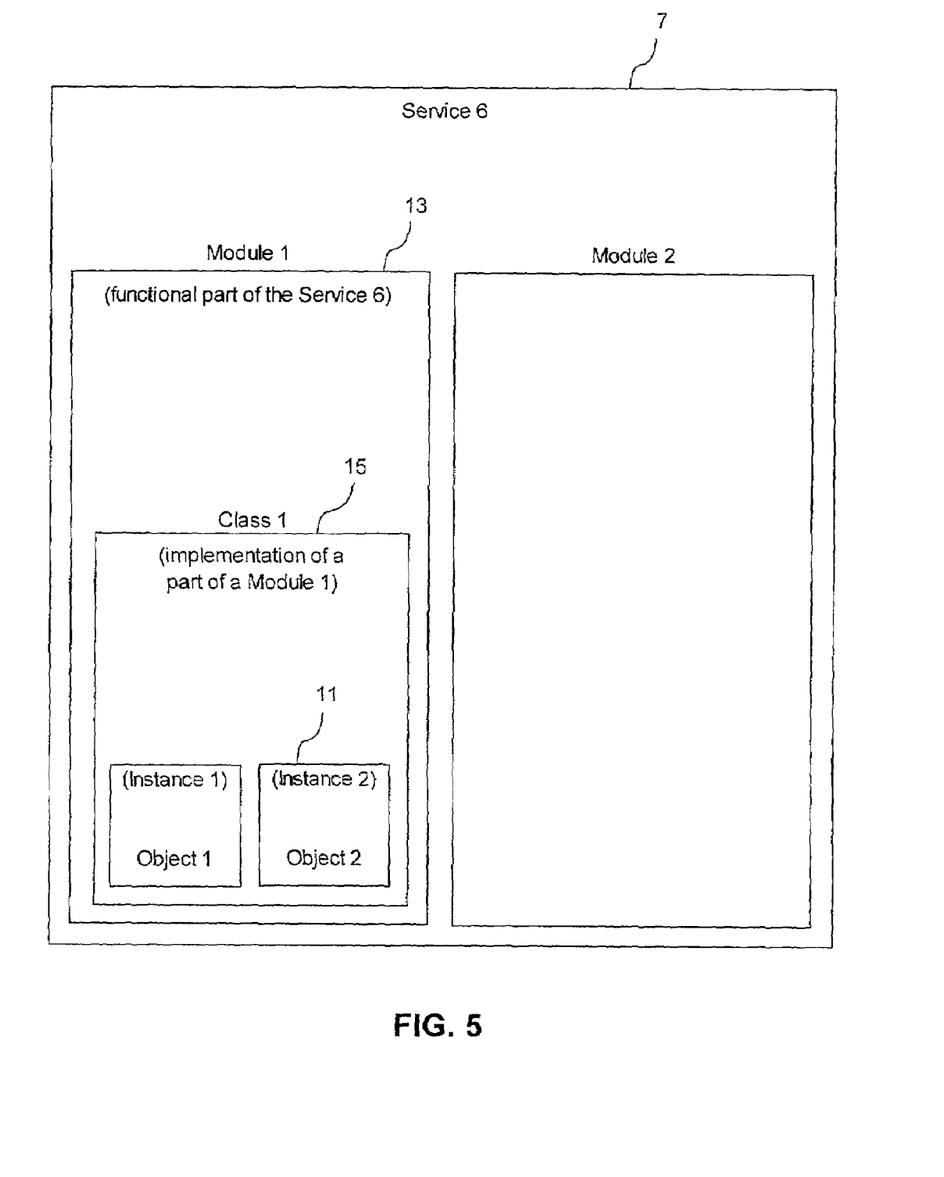
FIG. 5 is a diagram illustrating the structure of a service or application.

A service 7 may contain, in an object-oriented way, see FIG. 5, a group of objects 11 which can be regarded as some group of executable instructions and a set of current or instant data. Each object 11 thus has a relation to a service 7, i.e., the application. A module 13 is a group of classes that are a functional part of a service. A service contains one or several modules and a module contains one or several classes. A class 15 is an implementation of a part of the module. Every class could have one or several instances, which are the objects 11 already mentioned. There could be thousands of objects existing at the same time in a large worldwide web application.

When an application 7 on a server 3 connected to the Internet 1 is started, some computer program section or method can be run on a programming language, such as Java, as is assumed herein, the program section then being a Java scriptlet. In the code of the program section, instructions are added for storing basic or initiating information relevant to the application in a persistent location 601, see FIG. 6, as will be described below. Special classes called, for example, WAM, Module$_{13}$ name and Class$_{13}$ name may be defined which is only used for supervision purposes.

When a user from a network terminal 5 connected to the Internet 1 logs into the already started application 7, a program section comprised in the application is started and then a file is sent to the terminal and there generates, through a browser-program, an image or page shown on the display or monitor of the terminal. On the page, various fields for entering information can be provided and simple "button" fields which can be marked by the user by moving some pointing means such as a computer mouse and "clicking" on it, i.e., pressing a button on the mouse. For most of such operations, program sections or scriptlets are started which perform the specific steps of the service or application, one scriptlet being specially provided for or linked to each such operation.

In at least some of the scriptlets, which generally are shorter or longer sections of code, special instructions are inserted for allowing a supervision of the execution of the program section by entering information in the persistent location. Thus for each such program section an instruction is added first in the executable code for creating a special object, an instance of a special class or example called WAM, that is designed only for the supervision of the execution of the program section, see the items "Object X" and "Object Y" in the schematic view of FIG. 1. Other added instructions invoke special methods are designed for the supervision of the program sections, these methods called an API (Application Programming Interface) and illustrated by the blocks 102. The special methods can include a method Register for registering an object in the persistent location, a method Deregister for cancelling the registering an object and methods for storing information on the specific execution of program sections, such as alarm parameters and messages.

In an instruction added directly after the instruction for creating the special object, this object is registered by invoking the method Register and then information related to the object is stored in the persistent location. In further added instructions messages and information related thereto and alarm parameters and information related thereto can be stored in the persistent location. Alarm parameters are metrics or numeral values related to the object. Finally, in a final instruction of the code section, i.e., in an instruction inserted as the last one before terminating the program section, the special object is deregistered by invoking the method Deregister. Then the information stored in the persistent location and related to the object is cancelled. Also, other possible information, e.g., alarm parameters, used in the program section may be cancelled by the same method.

Figure 1:
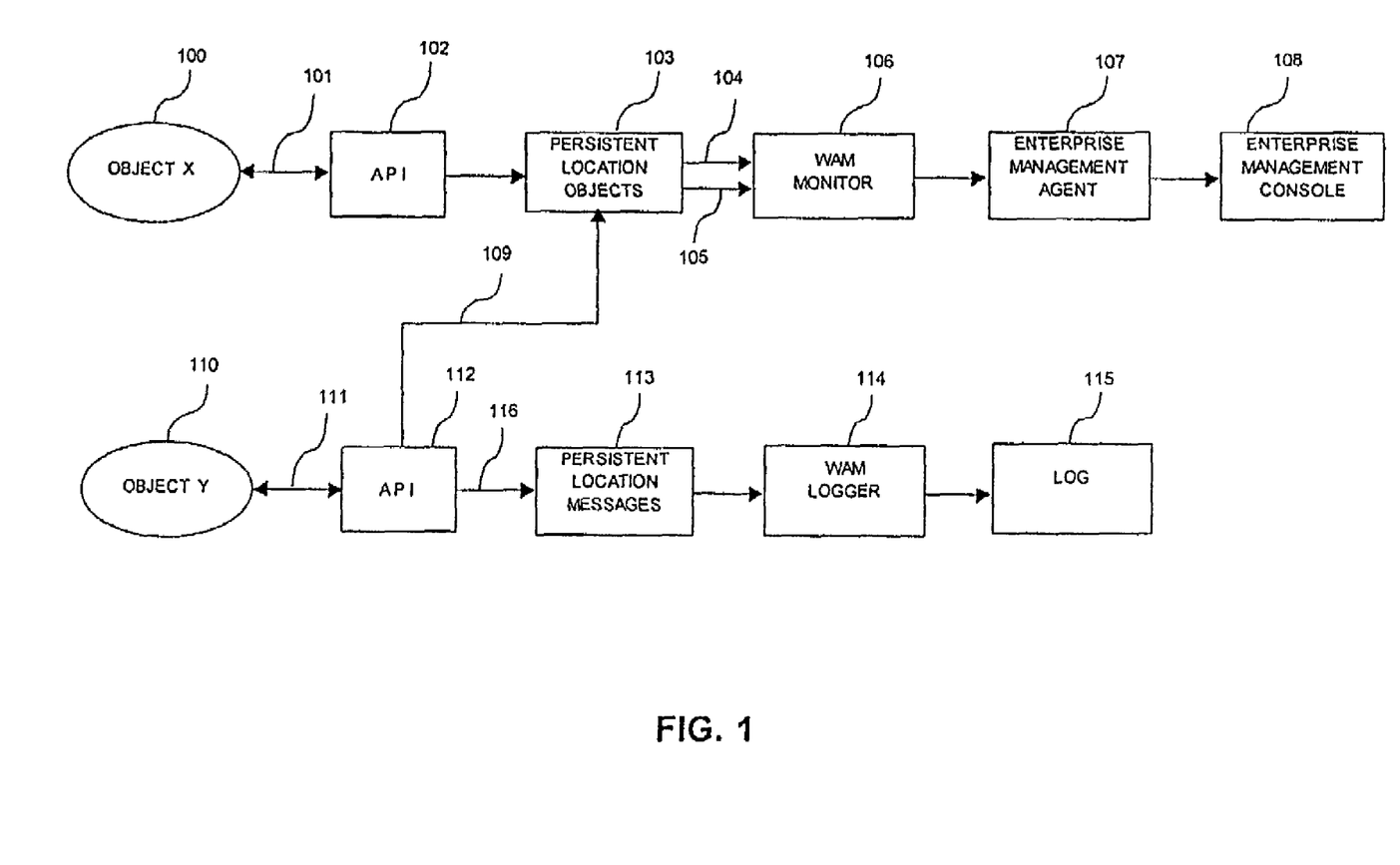
FIG. 1 is a schematic flowchart illustrating registering objects and supervising objects and messages.

Some of the information stored in the persistent location 601, in particular the information related to alarm parameters and objects, is monitored or scanned by a supervising or monitoring program 106 as illustrated in FIG. 1. The monitoring program can also supervise the information related to messages for detecting events. The monitoring program 106 informs a management program 107, also called an enterprise management agent, in the case where the monitoring program detects that some object information has expired or the alarm parameters have passed threshold values or it detects an event among the information stored for messages.

Some of the information stored in the persistent location, the information related to messages, is at suitable periodically repeated times stored by logging program 114 on a suitable mass memory medium such as a special hard or compact disk 115.

Figure 6:
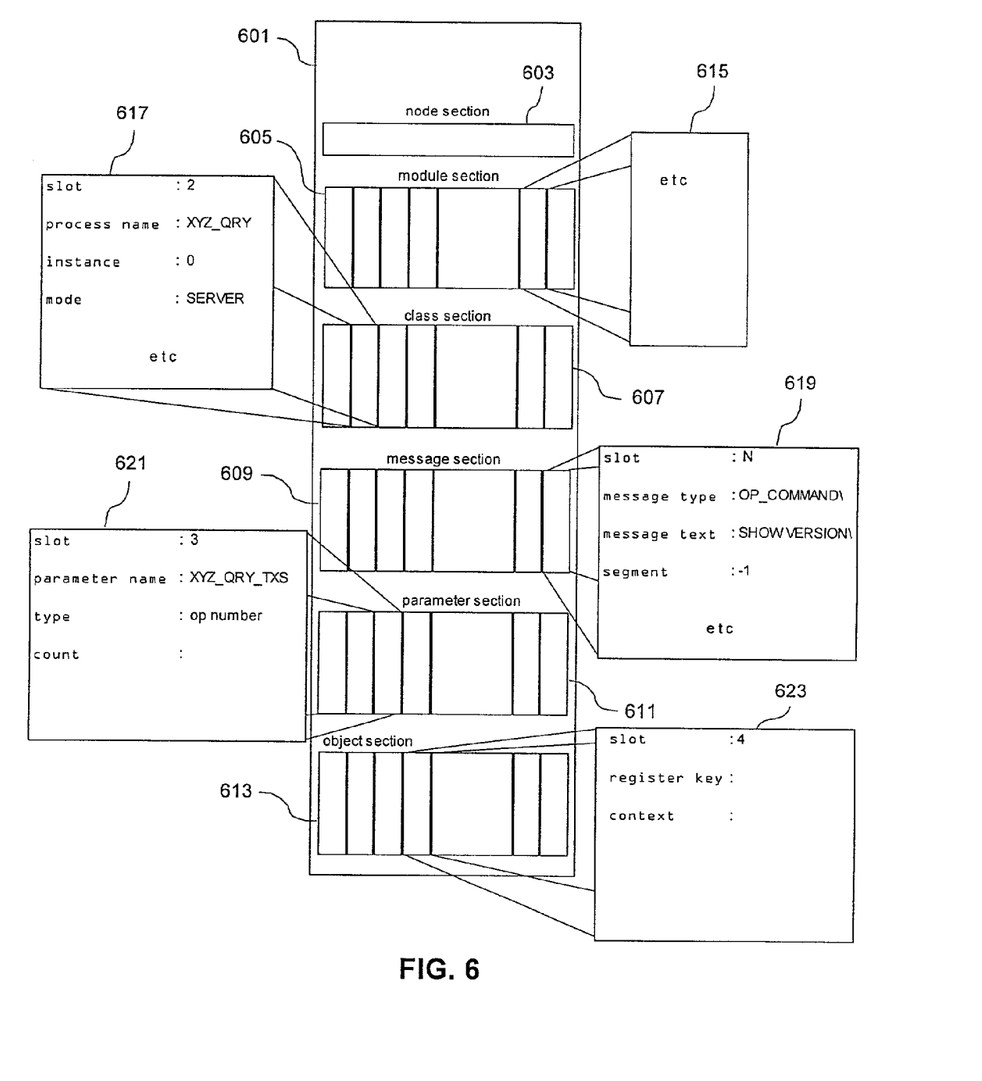
FIG. 6 is a schematic diagram illustrating the organization of a persistent location memory.

The persistent location 601, see FIG. 6, is herein assumed to be a shared memory in a server 3. A shared memory is a portion of the memory of a computer or server which can be accessed by all the programs executed in the computer. However, generally the information for each service could also be stored in some other memory such as a protected memory assigned to the service, provided that a supervising program in some way can be granted access to the information.

The organization of the memory area 601 called the persistent location is illustrated in FIG. 6. The persistent location 601 comprises six subareas, a node section 603, a module section 605, a class section 607, a message section 609, a parameter section 611 and an object section 613. Each of the subareas except the node section 603 is organized like a register or table in a database and comprises a plurality of slots 615, 617, 619, 621 and 623 respectively, each slot having an order number or sequential address and in each slot information of a single item being stored.

In the first subarea, the node section 603, information is stored about the current computer or server such as the computer name, the IP address of the computer, etc.

In the second subarea, the module section 605, information of all used modules 13 is stored and thus in each slot 615 of the module section 605 information of a single module is stored. This information of each individual module used comprises a field for storing an identification of the module such as the name or order number of the module and possibly fields for storing other relevant information such as the current operational mode of the module.

In the third subarea, the class section 607, information about each used class is stored and thus in each slot 617 comprised therein there is a field for storing an identification of a class such as the class name, a field for the storing a number of the instances of the class which are being currently executed and mode field.

In the fourth subarea, the message section 609, information that is to be logged or to be delivered to the console 108 is stored. In each slot 619 in this section information of a message, usually in text format, is stored. Specifically, in each slot 619 there is a field for storing a message type, as will be described hereinafter, a field for storing message text, and a field for storing a segment identification necessary for messages that are split up to be stored in more than one slot and possibly more fields for storing other relevant information.

At least two different types of messages called log messages and event messages and wait can be used. The slots 619 of the message section are used as intermediate storage areas, each area having a fixed size. If a message does not fit in one slot it is split and stored in as many slots as needed.

Each event messages contains information about a specific event. Event messages are detected by the monitoring procedure 106 and they can be transferred to the management agent 107 and the console 108. Various event types can be used such events describing error conditions.

Log messages only hold information that is to be written to a more or less permanent memory 115 by the logging procedure 114.

In the fifth subarea, the parameter section 611, alarm parameters used to define alarms when threshold values set by the supervising program 106 are being or have been passed are stored. Particularly, the alarm parameters comprise count values. Thus in each slot 621 of the parameter section there are a field for storing an identification of a parameter, i.e., the parameter name, a field for storing information of the program section or object in which the parameter is set and updated, a field for storing the type of the parameter, a field for storing the count and possibly other fields for storing relevant information.

Three different types of parameters, quantity, number and mean value can, e.g., be used. Parameters of the quantity type represent an absolute measure of some entity that for example can be the size of a transaction message. The number type is a strictly increasing value. It can for example be the number of times that a certain request have been served by a program section. The last type is the mean value parameter type, which is simply a way to keep track of a mean value of some numeric entity.

In the sixth subarea, the object section 613, information on the instances of a class that are currently being executed or that have recently been executed is stored. Each slot 623 of the object section may include (perhaps with other fields) a field for storing a pointer to class, a field for storing a unique register key, as will be described below, for printing, a field for an identification of a context for printing, a field for storing a time of registering, a field for storing information of the remaining time until expiration, a field for an activity counter, a field for storing the value of an expiration time period to be used when initiating or re-initiating the information in the field for information of the remaining time and a field for storing an indication whether the object is in a running or lost state. An object is said to be running or in a running state if there has been activity recorded for the object in the time period of length equal to the expiration time up to the current time. An object is said to be lost or in a lost state if there has been no activity recorded for the object during the time period of length equal to the expiration time up to the current time.

The initiating procedure executed when starting the service stores the basic information in the node section 603 in the persistent location, information relevant to each module of the application in the slots 615 of the module section 605 and information relevant to each class of the modules in the slots 617 of the class section 607 in the persistent location 601.

When registering an object is registered the relevant information related to the object is stored in a slot 623 of the objection section 613 of the persistent location. In other special instructions information related to messages is stored in the slots 619 of the message section 609 and information related to alarm parameters are stored in the slots 621 of the parameter section. When an object is deregistered the information related to the object is removed from the persistent location by marking the slot 623 used therefore to be empty. Also possible used slots 621 for alarm parameters are marked empty.

The monitoring program 106 supervises the object information stored in the object section 613 for expiration, the alarm parameters or metrics of the objects stored in the parameter section 611 whether they have passed threshold values and the message information stored in the message section 609 whether some events are present. When the logging program 114 stores the message information it can reset the slots 621 of the message section or mark them to be empty.

Figure 2:
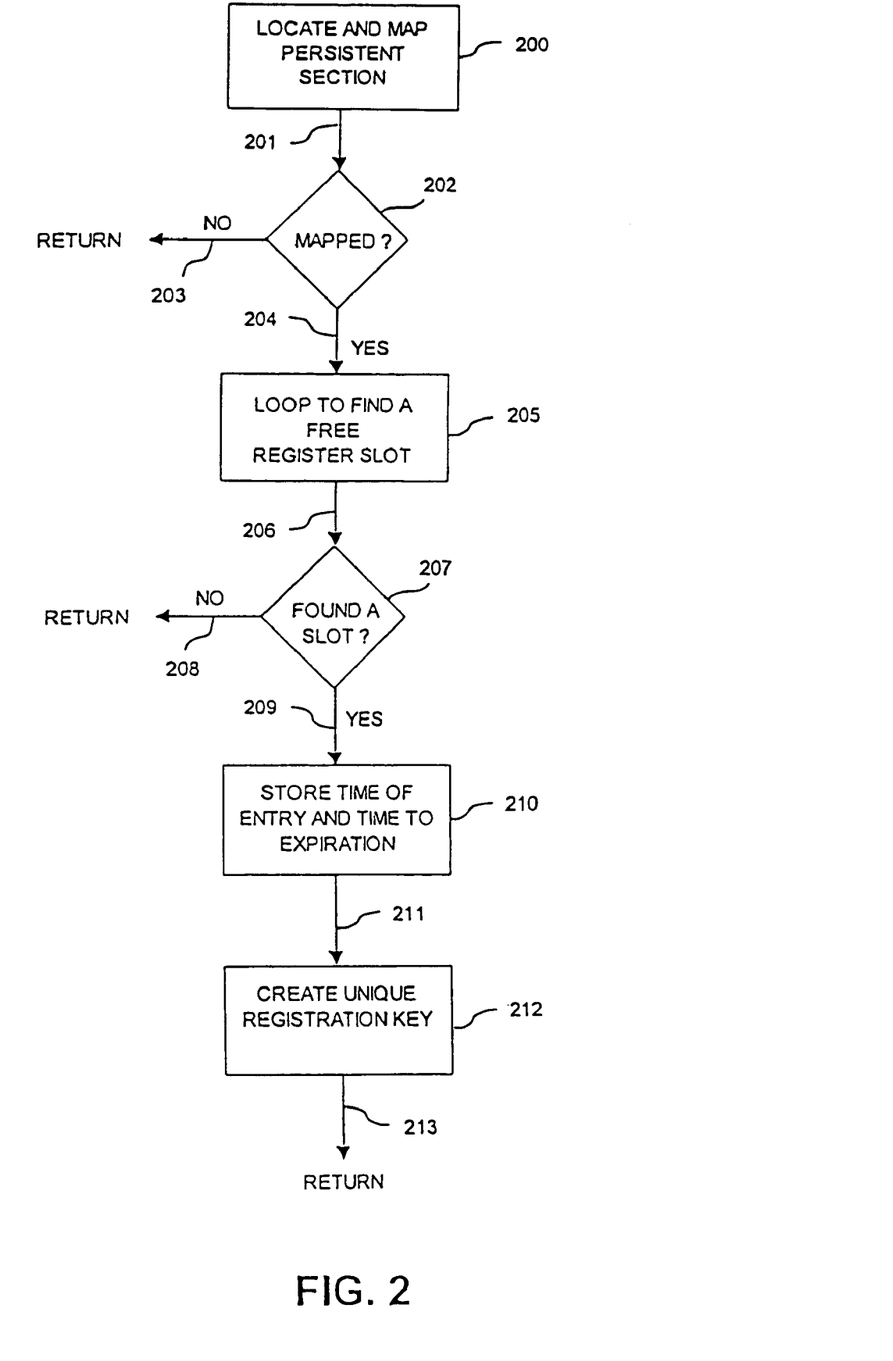
FIG. 2 is a flowchart illustrating steps executed in a procedure for registering an object.

The registering of an object performed by the registration method or procedure called Register is illustrated by the flow diagram of FIG. 2. The procedure starts in a block 200 in which the persistent location 601 is located and mapped. This is a fast operation using a shared memory as described above and then it is asked in block 202 whether the persistent location exists or the mapping has been completed successfully. If no persistent location is found or the mapping could not be executed, the method returns, see the arrow 203, and then no monitoring can be made.

If the persistent location exists and can be mapped, the object section 613 thereof is accessed and is searched to find a free slot 623. If it is determined in the block 205, that all slots 623 are occupied, the method returns, as indicated by the arrow 208, and then the object cannot be registered.

If it instead is determined in the block 205 that a free slot 623 exists, a block 210 is executed, in which information on the current object is stored, see the description of the contents of a slot 623 given above. Then information can be stored in the slot. Thus in the block 210 the current time, i.e., the time of storing information in the slot, and a value of an expiration time period. In the next block 212 a unique registration key or register key is created by the method and is stored in the slot. The register key is to be used when tracing object creation. The information stored in an object section slot includes some information, is e.g., the register key, identifying the object and an expiration period. Furthermore, other information, not illustrated in FIG. 2, can be stored in the selected slot 623 such information, e.g., including information identifying a link that is set-up to the class 607 of which the object is an instance. In the slot 617 of the class section a count of instances, which are currently being executed, is stored. In addition, in the slot the field including information on the time period remaining until expiration is set to be equal to the expiration time and the field for storing the activity counter is reset, i.e., is set to be equal to zero.

The register key of an object can comprise sub-fields for the server name, the application name, the time when the registering the object is made and the order number of the slot 623 in the object section 613 in which the object information is stored.

In the call for executing the Register method the expiration time period is specified. This period informs on the expected time before the object should be deregistered. Alternatively or additionally, this time period can be set in the configuration of the class of which the considered object is an instance, this value being, e.g., taken as a default value. After storing the information in the object slot 623 the registration method is completed and a return is made, as indicated by the arrow 213.

The monitoring procedure 106 constantly or periodically scans primarily the parameter and object sections 611, 613 of the persistent location 601. Also the message section 609 can be scanned for events.

Figure 3:
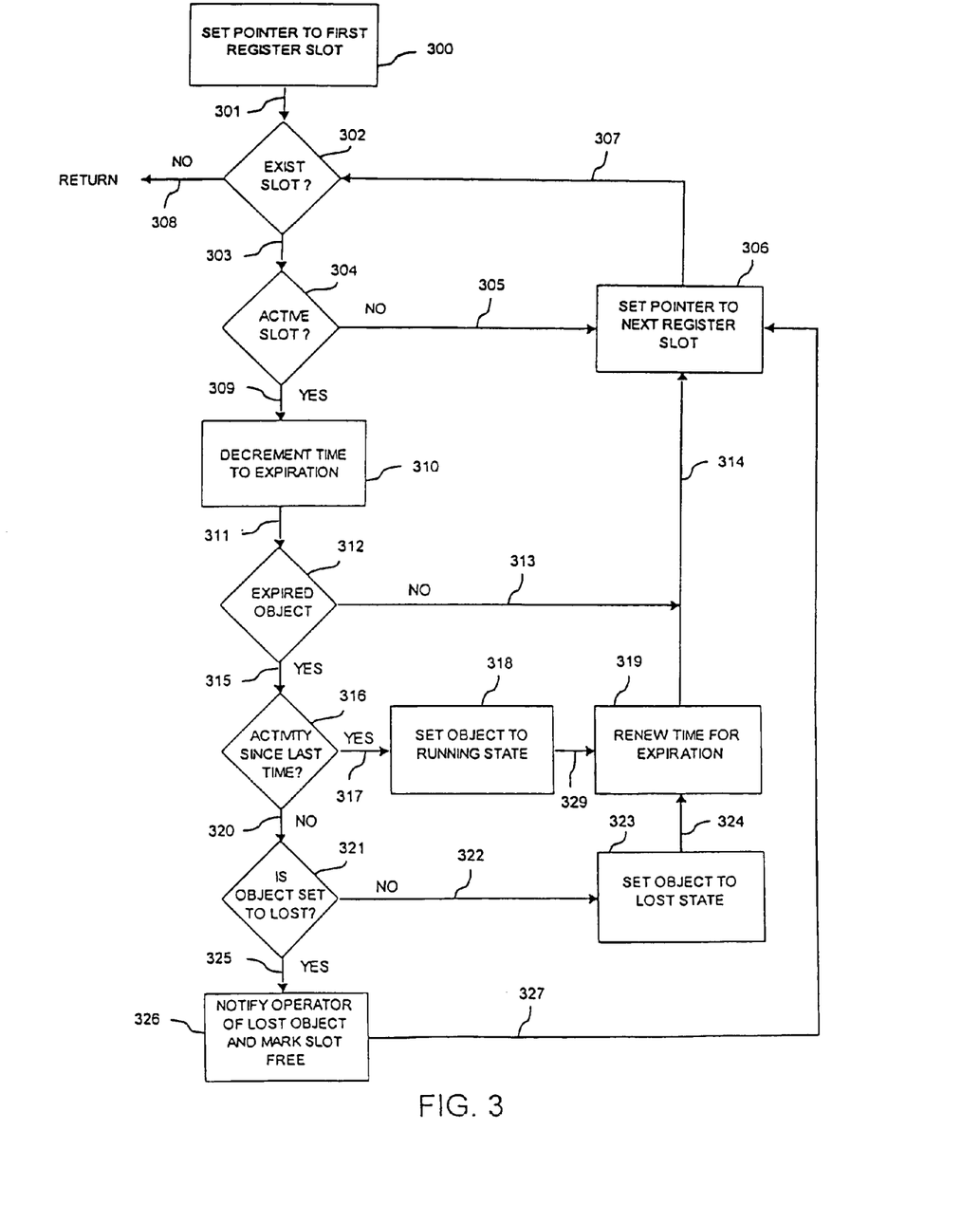
FIG. 3 is a flowchart illustrating steps executed in a scanning routine comprised in the monitoring program.
Figure 4:
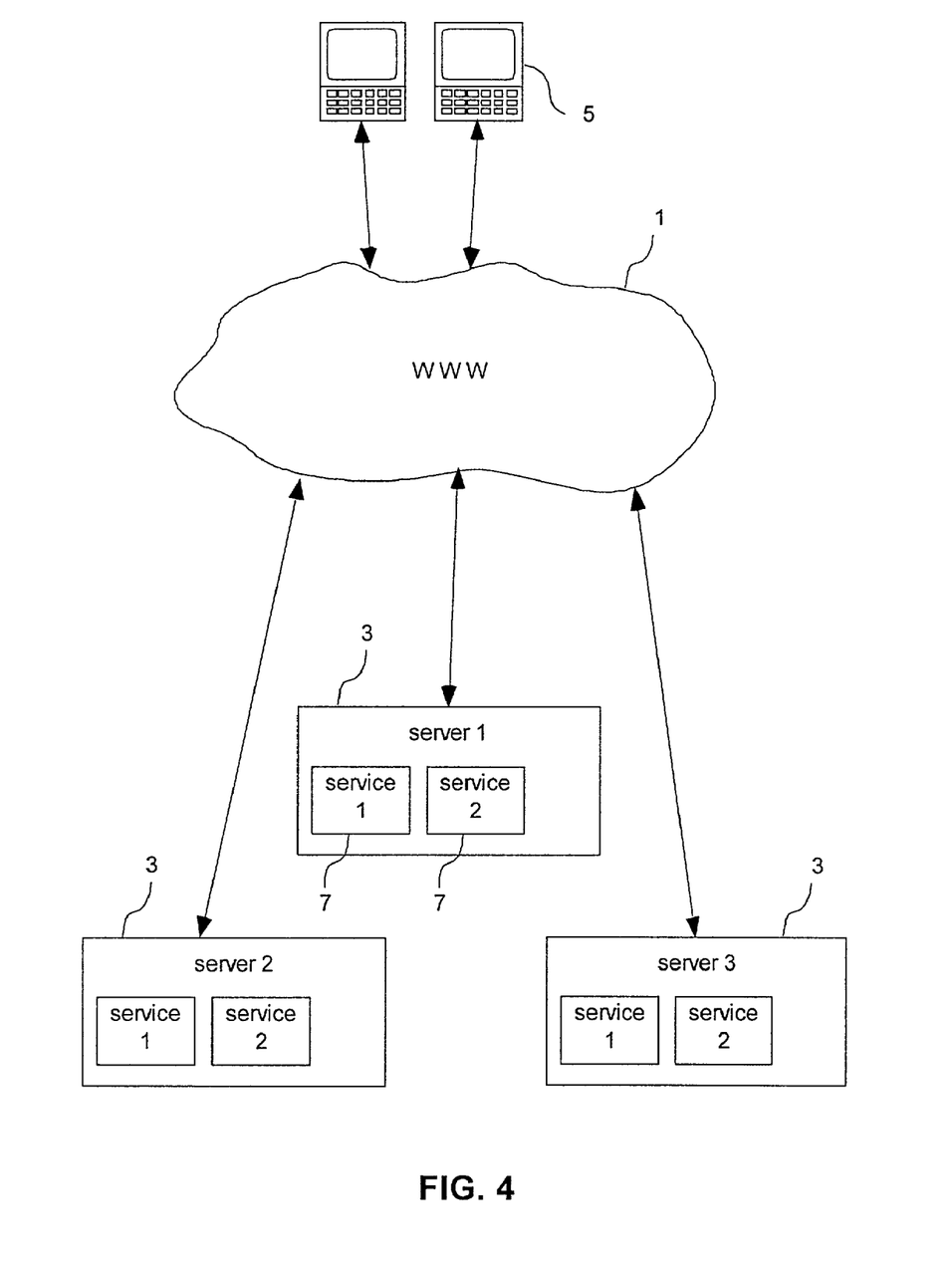
FIG. 4 is a schematic picture illustrating Internet components.

The process when scanning the object section is illustrated by the flow diagram of FIG. 3. In a first block 300 a pointer, not shown, is set to indicated the first object section slot 623. Then it is determined in a block 302 whether the block indicated the pointer, exists. If it does not exist, it means that all slots have been handled and the procedure exits as indicated by the arrow 308. Otherwise it determined in a block 304 whether the slot indicated the pointer is an active slot, i.e., whether information for an object being currently executed is stored therein. The determination is made by testing some marking field, not shown, of the slot. If it is determined that the slot is not active, a block 306 is executed in which the pointer is set indicate the next slot of the object section 613. After block 306, the block 302 is again executed, as described above.

If it is determined in the block 304 that the current slot is active, the information stored in the slot is accessed. Then in a block 310 the information or value of the time remaining until expiration is decremented by the time period elapsed from the previous scanning of the object section 613. In the next block 312 it is determined, whether the object has expired. This can be done by testing the result of the decrementing in the previous block 310 whether, e.g., the result is equal to or lower than zero. If it is determined that the object has not expired, the block 306 is performed as above by stepping the pointer to indicate the next slot.

If it is determined in the block 316 that the object has expired, a block 312 is executed in which it is decided whether there has been activity in the object since the previous scanning of the object section 613. It is determined by testing the activity counter to find out whether it is larger than zero. If it is found that there has been activity in the object, the object is only set to being running state, by setting the state field accordingly, in a block 318, the activity counter is reset, not shown, and in the next block 319 the time until expiration is renewed or restarted by setting it equal to the expiration time period. Then the block 306 is executed as described in order to possibly handle a new slot.

If it is determined in the block 316, that no activity has been recorded since the previous scanning, a test on the state of the object is made in a block 321, and it is specifically tested whether the object is set to be in lost state. If it is found that the current object is set not to be lost, the object is set to now be in the lost state in a block 323. Thereupon, the block 319 is executed as described re-initiating the time until renewal.

If it is determined in the block 321 that the object is in a lost state, a block 326 is executed in which an alarm is made, e.g., to an alarm program such as the enterprise management agent 107, also called a management framework or agent which in turn can inform an operator by displaying information on the enterprise management console 108, see FIG. 1. After executing the block 326, the slot storing the last object is marked free, and the block 306 is executed again to possibly handle a new slot.

The monitoring procedure 106 can also monitor the parameter section 611 of the persistent location 610 for alarm parameters having passed threshold values and the message section 609 for events.

Contexts are sets of data or information. They are defined in the setup of the application or service and make it possible to define code areas holding dynamic data. The introduction of contexts in the monitoring system makes it possible to store session related information when entering execution of certain code areas. The use of contexts makes it easier to correlate faults in objects in a distributed environment. Contexts are stored in the persistent location related to the object, but could be retrieved in XML format and further stored from XML format. This makes it possible to transport contexts between objects and between servers, holding information that could be very important to identify the source of a problem or fault that has occurred.

The register key created when registering an object can be later used when performing a register, e.g., when registering objects created by a current object to show inheritance. When the register key is used in this way, it possible to see a relation in time between different objects and their execution.

These are the two basic methods for registration of objects. One method is used in the case where no previous relation exists for an object, and another method in the case where a previous returned key can be used as a relation parameter.

There are also some methods for context manipulation: enter, leave, get and set context. The use of a context is not required to allow the supervising of activities but it improves the handling of errors. The context could be for example an account, which makes it simpler to trace errors since it is known.

Figure 7:
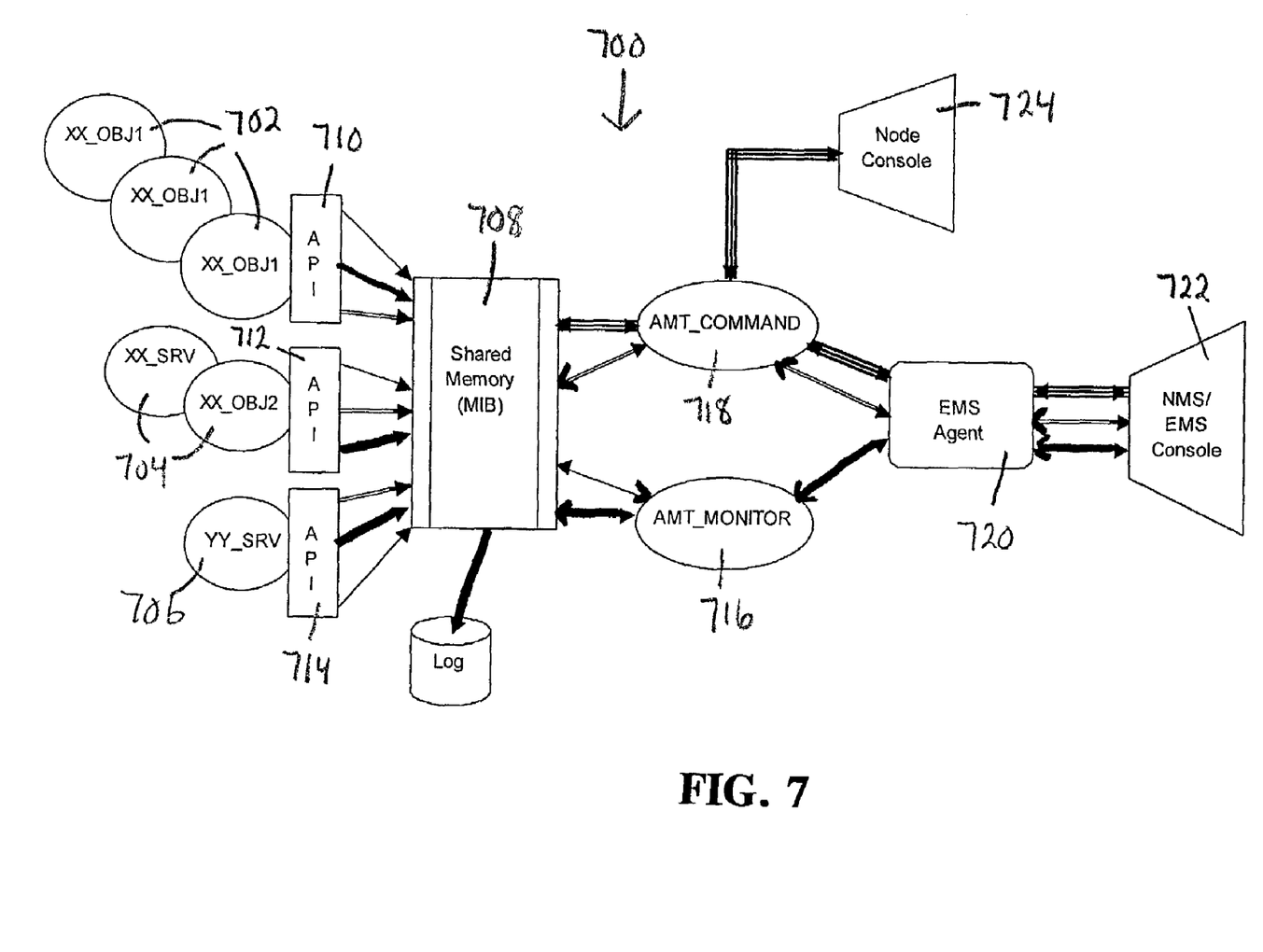
FIG. 7 is a schematic flow chart illustrating the relationship between the objects, the persistent location, the monitor and the Enterprise Management Framework.

FIG. 7 illustrates a system device 700 showing the relationship between the objects, the persistent location, the monitor and the enterprise management framework. More particularly, the system 700 has objects/classes 702, 704, 706. When a copy of the classes are run, that is when objects are being instanciated, information about each classes is stored in separate slots in a shared memory 708 via application program interface units 710, 712 and 714. Several instances may be run simultaneously by different users, i.e., the users may run different copies of the same program code but with different data. When the units 710, 712, 714 activate program codes that may be used to generate an identity of the created object that is stored in the memory 708. Once the identity information is stored or registered, a timer starts in the memory 708 to keep track of how long the identity information has been stored in the memory. Preferably, each unit 710, 712, 714 is adapted to run program codes that are different from one another. For example, the unit 710 may be used when a user is searching for a house. The unit 712 may be used when a user is expressing an interest in a house and the unit 714 may be used when a user seeks more information about a house that the user has already identified.

A monitor 716, such as an AMT_MONITOR, may scan the shared memory 708 to identify information that has timed out, i.e., to identify the event that the information has been stored too long in the memory 708. The monitor 716 may be designed to look for identity information that relates to certain classes 702, 704, 706 only. A command unit 718, such as an AMT_COMMAND, may monitor the activity in the memory by gathering statistical data. For example, the unit 718 may determine that one class is used simultaneously by a substantially higher number of users than it was designed for. The unit 718 may then trigger a message to the users of that particular class that there are currently an unusually large number of users and that the user may experience some delay in processing. This message may be displayed on the web site as long as the user volume is unusually high. A monitoring unit 720, such as an EMS agent, monitors that the network, computers and certain applications work properly. A network management system unit 722 is a console that cooperates with the unit 720. The command unit 718 may cooperate with a node console 724 so that it is not necessary to use the EMS agent. The node console 724 is often less expensive than the monitoring unit 720.

While the present invention has been described in accordance with preferred compositions and embodiments, it is to be understood that certain substitutions and alterations may be made thereto without departing from the spirit and scope of the following claims.

We claim:

1. A computer-implemented method of supervising the execution of one or more program sections written in an object-oriented programming language, comprising:
   (a) starting a program section and creating an object as an instance of a class;
   (b) storing in a memory a timing information unit associated with the created object and an expiration time period associated with the stored information unit, the information unit associated with the created object allowing supervision of execution of the program section;
   (c) removing the timing information unit stored in the memory when the associated object is completed;
   (d) scanning the memory to identify a timing information unit associated with an object that is not completed and for which there has been no activity for a time period longer than the associated expiration time period;
   (e) testing the object associated with the identified timing information unit to determine whether the object is active or not active; and
   (f) if the object is active, resetting the associated expiration time period, and if the object is inactive, triggering an alarm signal.

2. The method according to claim 1, wherein step (b) further comprises recording a starting time of the expiration time period.

3. The method according to claim 1, further comprising: designating the uncompleted object for which there has been no activity for a time period longer than the associated expiration time period as being in a lost state.

4. The method according to claim 3, wherein the alarm signal indicates that a failure associated with the lost object has been detected.

5. The method according to claim 1, further comprising: maintaining statistical information about a number of instances in each class.

6. The method according to claim 5, further comprising: generating a message when a usage volume exceeds a predetermined level.

7. The method in claim 1, further comprising creating a register key associated with the object.

8. The method in claim 1, further comprising storing one or more contexts in a memory location associated with the created object, and
   correlating faults in objects in a distributed environment using the one or more contexts.

9. A computer-implemented method of supervising the execution of one or more program sections written in an object-oriented programming language, comprising:
   (a) starting a program section and creating an object;
   (b) storing a timing information unit identifying the created object in a memory, the timing information unit associated with the created object allowing supervision of execution of the program section;
   (c) removing the timing information unit stored in the memory when the created object is completed;
   (d) scanning the memory to identify a timing information unit associated with an object that is not completed and for which there has been no activity for a time period longer than a predetermined time period;
   (e) testing to determine if the associated object is active or inactive;
   (f) for each timing information unit identified in step (d) when the object is inactive, notifying an operator and marking a memory location storing the information unit as free; and
   (g) resetting an activity time period for the object when the object is active.

10. The method in claim 9, further comprising:
    (g) delaying a transmission of the alarm signal for each timing information unit identified in step (d) when the created object is active.

11. The method in claim 9, further comprising creating a register key associated with the object.

12. The method in claim 9, further comprising storing one or more contexts in a memory location associated with the created object, and
    correlating faults in objects in a distributed environment using the one or more contexts.

13. Apparatus for supervising the execution of one or more program sections written in an object-oriented programming language, comprising:
    electronic circuitry configured to start a program section and creating an object as an instance of a class; and
    a memory for storing a timing information unit associated with the created object and an expiration time period associated with the stored timing information unit, the timing information unit associated with the created object allowing supervision of execution of the program section;
    the electronic circuitry further configured to:
        remove the timing information unit stored in the memory unit when the created object is completed;
        scan the memory to identify the timing information unit associated with an object that is not completed and for which there has been no activity for a time period longer than the associated expiration time period;
        test to determine if the associated object is active or inactive;
        trigger an alarm signal in response to the identified timing information unit if the object is determined to be inactive; and
        reset the associated expiration time period if the object is determined to be active.

14. The apparatus according to claim 13, wherein the electronic circuitry is further configured to record a starting time of the expiration time period.

15. The apparatus according to claim 13, wherein the electronic circuitry is further configured to detect the uncompleted object for which there has been no activity for a time period longer than the associated expiration time period as being in a lost state.

16. The apparatus according to claim 15, wherein the electronic circuitry is further configured to delay termination of the program section after lapse of the expiration time period if the created object is active.

17. The apparatus according to claim 15, wherein the alarm signal indicates that a failure associated with the lost object has been detected.

18. The apparatus according to claim 13, wherein the electronic circuitry is further configured to:
    maintain statistical information about a number of instances in each class.

19. The apparatus according to claim 13, wherein the electronic circuitry is further configured to:
    generate a message when a usage volume exceeds a predetermined level.

20. The method in claim 13, wherein the electronic circuitry is further configured to create a register key associated with the object.

21. The method in claim 13, wherein the electronic circuitry is further configured to store one or more contexts in a memory location associated with the created object and to correlate faults in objects in a distributed environment using the one or more contexts.

22. An apparatus for supervising the execution of one or more program sections written in an object-oriented programming language, comprising:
   electronic circuitry configured to start a program section and creating an object as an instance of a class; and
   a memory for storing timing information unit identifying the created object;
   the electronic circuitry further configured to:
   remove the timing information unit stored in the memory when the created object is completed or inactive;
   scan the memory to identify the timing information unit having been stored in the memory for a time period longer than a predetermined time period;
   test the object associated with the identified timing information unit to determine whether the object is active or not active; and
   if the object is active, reset an activity time period associated with the object, and if the object is inactive, designate the object as being in a lost state and send an alarm signal.

23. The apparatus in claim 22, wherein the electronic circuitry is further configured to send the alarm signal only when the information unit has been stored in the memory for a time period longer than the predetermined time period and the created object is inactive.

24. The apparatus in claim 22, wherein the electronic circuitry is further configured to delay sending the alarm signal when the created object is active.

25. The method in claim 22, wherein the electronic circuitry is further configured to create a register key associated with the object.

26. The method in claim 22, wherein the electronic circuitry is further configured to store one or more contexts in a memory location associated with the created object and to correlate faults in objects in a distributed environment using the one or more contexts.

27. A computer-implemented method of automatically supervising execution in an object-oriented software application, comprising;
   (a) registering an object in a persistent location;
   (b) specifying an expected expiration time associated with the object indicating an expected expiration time when the object is expected to terminate;
   (c) deregistering the object, when the object terminates by the expected expiration time, by removing the object from the persistent location;
   (d) supervising the persistent location to detect an object that has not been deregistered after expiration of the expected expiration time associated with the object;
   (e) testing the detected object to determine whether the object is active or not active, and if the object is active, resetting the expected expiration time associated with the object; and
   (f) if the object is inactive, creating a report indicating an operational failure for the inactive object.

28. The method in claim 27, further comprising creating a register key associated with the object.

29. The method in claim 27, further comprising storing one or more contexts in a memory location associated with the created object, and
   correlating faults in objects in a distributed environment using the one or more contexts.

* * * * *